United States Patent
Ito et al.

(10) Patent No.: US 11,217,820 B2
(45) Date of Patent: Jan. 4, 2022

(54) ALL SOLID BATTERY AND MANUFACTURING METHOD OF THE SAME

(71) Applicant: TAIYO YUDEN CO., LTD., Tokyo (JP)

(72) Inventors: Daigo Ito, Takasaki (JP); Takato Satoh, Takasaki (JP); Sachie Tomizawa, Takasaki (JP); Chie Kawamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 314 days.

(21) Appl. No.: 16/365,375

(22) Filed: Mar. 26, 2019

(65) Prior Publication Data

US 2019/0305369 A1 Oct. 3, 2019

(30) Foreign Application Priority Data

Mar. 29, 2018 (JP) .............................. JP2018-064711

(51) Int. Cl.
*H01M 4/66* (2006.01)
*H01M 10/0562* (2010.01)
*H01M 10/058* (2010.01)

(52) U.S. Cl.
CPC ....... *H01M 10/0562* (2013.01); *H01M 4/661* (2013.01); *H01M 4/663* (2013.01); *H01M 10/058* (2013.01); *H01M 2300/002* (2013.01)

(58) Field of Classification Search
None
See application file for complete search history.

(56) References Cited

U.S. PATENT DOCUMENTS

2010/0304274 A1* 12/2010 Bennett ............... H01M 4/8605
429/499
2017/0125841 A1 5/2017 Ito

FOREIGN PATENT DOCUMENTS

| JP | 2008198492 A | 8/2008 |
|---|---|---|
| JP | 2017084643 A | 5/2017 |
| WO | 2014042083 A1 | 3/2014 |

* cited by examiner

*Primary Examiner* — Tracy M Dove
(74) *Attorney, Agent, or Firm* — Law Office of Katsuhiro Arai

(57) ABSTRACT

An all solid battery includes: a solid electrolyte layer; a first electrode layer that is formed on a first main face of the solid electrolyte layer; a first electric collector layer that is formed on a face of the first electrode layer, the face being opposite to the first main face; a second electrode layer that is formed on a second main face of the solid electrolyte layer; and a second electric collector layer that is formed on a face of the second electrolyte layer, the face being opposite to the second main face, wherein at least one of the first electric collector layer and the second electric collector layer includes Pd and board-shaped graphite carbon, wherein a volume ratio of Pd and the board-shaped graphite carbon in the at least one of the first electric collector layer and the second electric collector layer is 20:80 to 80:20.

4 Claims, 4 Drawing Sheets

ALL SOLID BATTERY AND MANUFACTURING METHOD OF THE SAME

CROSS-REFERENCE TO RELATED APPLICATION

This application is based upon and claims the benefit of priority of the prior Japanese Patent Application No. 2018-064711, filed on Mar. 29, 2018, the entire contents of which are incorporated herein by reference.

FIELD

A certain aspect of the present invention relates to an all solid battery and a manufacturing method of an all solid battery.

BACKGROUND

Recently, secondary batteries are being used in various fields. Secondary batteries having electrolytic liquid have a problem such as leak of the electrolytic liquid. And so, all solid batteries having a solid electrolyte and other solid elements are being developed. In all solid batteries that has a solid electrolyte layer of phosphoric acid salt and is formed by firing, it is preferable that a material hardly reacting with each material is used, as a metal used for an electric collector layer. For example, there is disclosed a technology in which Pd (palladium) is used as the electric collector layer (for example, see Japanese Patent Application Publication No. 2017-84643 hereinafter referred to as Document 1). There is disclosed a technology in which Pd and Ag (silver) are used as the electric collector layer (for example, see Japanese Patent Application Publication No. 2008-198492 hereinafter referred to as Document 2). There is disclosed a technology in which fiber carbon is aligned in a predetermined direction in the electric collector layer (for example, see International Publication No. 2014/042083 hereinafter referred to as Document 3).

SUMMARY OF THE INVENTION

The present invention has a purpose of providing an all solid battery that is capable of achieving preferable performance while cost is suppressed, and a manufacturing method of the all solid battery.

According to an aspect of the present invention, there is provided an all solid battery including: a solid electrolyte layer including phosphoric acid salt-based solid electrolyte; a first electrode layer that is formed on a first main face of the solid electrolyte layer; a first electric collector layer that is formed on a face of the first electrode layer, the face being opposite to the first main face; a second electrode layer that is formed on a second main face of the solid electrolyte layer; and a second electric collector layer that is formed on a face of the second electrolyte layer, the face being opposite to the second main face, wherein at least one of the first electric collector layer and the second electric collector layer includes Pd and board-shaped graphite carbon, wherein a volume ratio of Pd and the board-shaped graphite carbon in the at least one of the first electric collector layer and the second electric collector layer is 20:80 to 80:20.

According to another aspect of the present invention, there is provided a manufacturing method of an all solid battery including: preparing a multilayer structure in which first paste for an electrode layer including ceramic grains, a green sheet including phosphoric acid salt-based grains, second paste for an electrode layer including ceramic grains, and second paste for an electric collector are stacked in this order on first paste for an electric collector; and firing the multilayer structure, wherein at least one of the first paste for an electric collector and the second paste for an electric collector includes Pd and board-shaped graphite carbon, wherein a volume ratio of Pd and the board-shaped graphite carbon in the at least one of the first paste for an electric collector and the second paste for an electric collector is 20:80 to 80:20.

DETAILED DESCRIPTION

In the technology of Document 1, it is possible to fire Pd together with the phosphoric acid salt-based solid electrolyte. However, cost may increase because Pd is expensive. In the technology of Document 2, it is possible to reduce an amount of Pd because Ag is used. However, during the firing, Ag may diffuse into the phosphoric acid salt-based electrolyte.

In the technology of Document 3, the fiber carbon has a problem in dispersion in slurry or paste. Therefore, preferable alignment may not be necessarily achieved, because the fiber carbon tends to be flocculated like entanglement of thread. In this case, short may occur between a positive electrode and a negative electrode. Document 3 recites that when fine particle carbon (acetylene black) is used, performance may be degraded because of unevenness of current density.

A description will be given of an embodiment with reference to the accompanying drawings.

Embodiment

Figure 1:
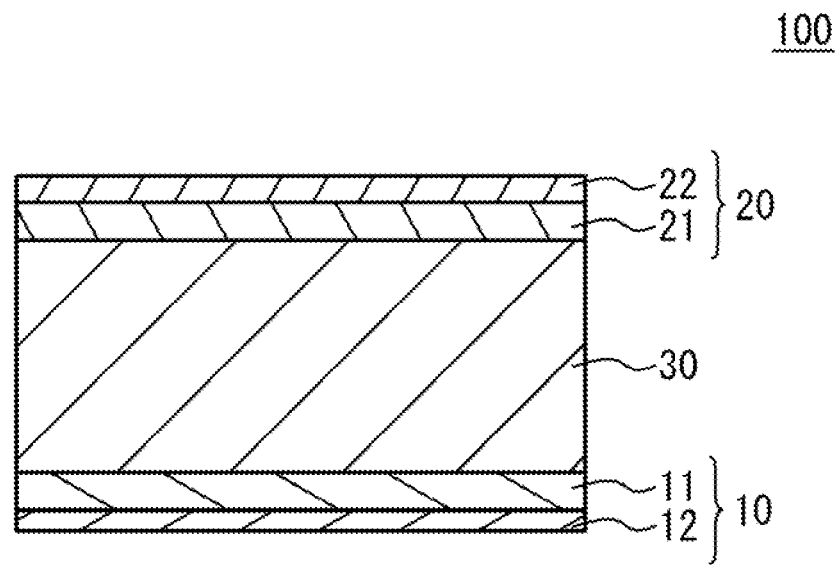
FIG. 1 illustrates a schematic cross section of an all solid battery in accordance with an embodiment.

FIG. 1 illustrates a schematic cross section of an all solid battery 100 in accordance with an embodiment. As illustrated in FIG. 1, the all solid battery 100 has a structure in which a first electrode 10 and a second electrode 20 sandwich a phosphoric acid salt-based solid electrolyte layer 30. The first electrode 10 is provided on a first main face of the solid electrolyte layer 30. The first electrode 10 has a structure in which a first electrode layer 11 and a first electric collector layer 12 are stacked. The first electrode layer 11 is on the solid electrolyte layer 30 side. The second electrode 20 is provide on a second main face of the solid electrolyte layer 30. The second electrode 20 has a structure in which a second electrode layer 21 and a second electric collector layer 22 are stacked. The second electrode layer 21 is on the solid electrolyte layer 30 side. Each thickness is not limited. However, when a thickness of the electrode layers is excessively small, it is not easy to enlarge a capacity density. When the thickness of the electrode layers is excessively large, a responsibility (output characteristic) of the all solid battery 100 may be degraded. And so, it is preferable that a thickness of the first electrode layer 11 and the second electrode layer 21 is 1 µm to 100 µm. It is more preferable that the thickness is 2 µm to 50 µm. When the solid electrolyte layer 30 is excessively thin, short may occur. When the solid electrolyte layer 30 is excessively thick, the output characteristic may be degraded and the capacity density may be reduced. And so, it is preferable that a thickness of the solid electrolyte layer 30 is 0.5 µm to 30 µm. It is more preferable that the thickness is 1 µm to 15 µm. The thickness of the first electric collector layer 12 and the second electric collector layer 22 is not limited. It is preferable that the thickness of the first electric collector layer 12 and the second electric collector layer 22 is 0.5 µm or more and 10 µm or less. When the thickness of the first electric collector layer 12 and the second electric collector layer 22 is smaller than 0.5 µm, there may be a problem that a path of electron conduction gets longer and a resistance may increase when a size of the all solid battery 100 is enlarged. When the thickness of the first electric collector layer 12 and the second electric collector layer 22 is smaller than 0.5 µm, the thickness of the first electric collector layer 12 and the second electric collector layer 22 is close to a thickness of board-shaped graphite carbon. In this case, smoothness of a coating film may be degraded. When the thickness of the first electric collector layer 12 and the second electric collector layer 22 is larger than 10 µm, there may be a problem from a viewpoint of energy density. It is more preferable that the thickness of the first electric collector layer 12 and the second electric collector layer 22 is 1 µm or more and 5 µm or less.

When the all solid battery 100 is used as a secondary battery, one of the first electrode 10 and the second electrode 20 is used as a positive electrode and the other is used as a negative electrode. In the embodiment, as an example, the first electrode 10 is used as a positive electrode, and the second electrode 20 is used as a negative electrode.

At least, the solid electrolyte layer 30 is a phosphoric acid salt-based solid electrolyte. For example, the solid electrolyte layer 30 has a NASICON structure. A phosphoric acid salt-based solid electrolyte having the NASICON structure has a high conductivity and is stable in normal atmosphere. The phosphoric acid salt-based solid electrolyte having the NASICON structure is, for example, such as a salt of phosphoric acid including lithium. The phosphoric acid salt is not limited. For example, the phosphoric acid salt is such as composite salt of phosphoric acid with Ti (for example $LiTi_2(PO_4)_3$). Alternatively, at least a part of Ti may be replaced with a transition metal of which a valence is four, such as Ge, Sn, Hf, or Zr. In order to increase an amount of Li, a part of Ti may be replaced with a transition metal of which a valence is three, such as Al, Ga, In, Y or La. In concrete, the phosphoric acid salt including lithium and having the NASICON structure is $Li_{1+x}Al_xGe_{2-x}(PO_4)_3$, $Li_{1+x}Al_xZr_{2-x}(PO_4)_3$, $Li_{1+x}Al_xT_{2-x}(PO_4)_3$ or the like. For example, it is preferable that Li—Al—Ge—$PO_4$-based material, to which a transition metal included in the phosphoric acid salt having the olivine type crystal structure included in the first electrode layer 11 and the second electrode layer 21 is added in advance, is used. For example, when the first electrode layer 11 and the second electrode layer 21 include phosphoric acid salt including Co and Li, it is preferable that the solid electrolyte layer 30 includes Li—Al—Ge—$PO_4$-based material to which Co is added in advance. In this case, it is possible to suppress solving of the transition metal included in the electrode active material into the electrolyte.

At least, the first electrode layer 11 used as a positive electrode includes a material having an olivine type crystal structure, as an electrode active material. It is preferable that the second electrode layer 21 also includes the electrode active material. The electrode active material is such as phosphoric acid salt including a transition metal and lithium. The olivine type crystal structure is a crystal of natural olivine. It is possible to identify the olivine type crystal structure, by using X-ray diffraction.

For example, $LiCoPO_4$ including Co may be used as a typical example of the electrode active material having the olivine type crystal structure. Other salts of phosphoric acid, in which Co acting as a transition metal is replaced to another transition metal in the above-mentioned chemical formula, may be used. A ratio of Li or $PO_4$ may fluctuate in accordance with a valence. It is preferable that Co, Mn, Fe, Ni or the like is used as the transition metal.

The electrode active material having the olivine type crystal structure acts as a positive electrode active material in the first electrode layer 11 acting as a positive electrode. For example, when only the first electrode layer 11 includes the electrode active material having the olivine type crystal structure, the electrode active material acts as the positive electrode active material. When the second electrode layer 21 also includes an electrode active material having the olivine type crystal structure, discharge capacity may increase and an operation voltage may increase because of electric discharge, in the second electrode layer 21 acting as a negative electrode. The function mechanism is not completely clear. However, the mechanism may be caused by partial solid-phase formation together with the negative electrode active material.

When both the first electrode layer 11 and the second electrode layer 21 include an electrode active material having the olivine type crystal structure, the electrode active material of each of the first electrode layer 11 and the second electrode layer 21 may have a common transition metal. Alternatively, the a transition metal of the electrode active material of the first electrode layer 11 may be different from that of the second electrode layer 21. The first electrode layer 11 and the second electrode layer 21 may have only single type of transition metal. The first electrode layer 11 and the second electrode layer 21 may have two or more types of transition metal. It is preferable that the first electrode layer 11 and the second electrode layer 21 have a common transition metal. It is more preferable that the electrode active materials of the both electrode layers have the same chemical composition. When the first electrode layer 11 and the second electrode layer 21 have a common transition metal or a common electrode active material of the same composition, similarity between the compositions of the both electrode layers increases. Therefore, even if terminals of the all solid battery 100 are connected in a positive/negative reversed state, the all solid battery 100 can be actually used without malfunction, in accordance with the usage purpose.

The second electrode layer 21 may include known material as the negative electrode active material. When only one of the electrode layers includes the negative electrode active material, it is clarified that the one of the electrode layers acts as a negative electrode and the other acts as a positive electrode. When only one of the electrode layers includes the negative electrode active material, it is preferable that the one of the electrode layers is the second electrode layer 21. Both of the electrode layers may include the known material as the negative electrode active material. Conventional technology of secondary batteries may be applied to the negative electrode active material. For example, titanium oxide, lithium-titanium complex oxide, lithium-titanium complex salt of phosphoric acid, a carbon, a vanadium lithium phosphate.

In the forming process of the first electrode layer 11 and the second electrode layer 21, moreover, oxide-based solid electrolyte material or a conductive material (conductive auxiliary agent) such as a carbon or a metal may be added. When the material is evenly dispersed into water or organic solution together with binder or plasticizer, a paste for electrode layer is obtained. Pd, Ni, Cu, or Fe, or an alloy thereof may be used as a metal of the conductive auxiliary agent.

The first electric collector layer 12 and the second electric collector layer 22 include Pd, as a conductive material. Pd is hardly oxidized and hardly reacts with each material, in a process of sintering each layer by firing. Among metals, Pd has large adhesive strength with ceramics. It is therefore possible to achieve large adhesive strength between the first electrode layer 11 and the first electric collector layer 12. And it is possible to achieve large adhesive strength between the second electrode layer 21 and the second electric collector layer 22. Accordingly, when the first electric collector layer 12 and the second electric collector layer 22 include Pd, the all solid battery 100 achieves preferable performance. On the other hand, Clarke number of Pd is extremely small. Therefore, Pd is very expensive.

And so, it is thought that an usage amount of Pd is reduced, by mixing a carbon material with Pd. It is thought that fiber (fibrous) carbon is used as the carbon material. When the fiber carbon is used, it is possible to reduce the usage amount of Pd. When alignment in a predetermined direction is applied to the fiber carbon, preferable current collecting is achieved and short between the positive electrode and the negative electrode is suppressed. However, the fiber carbon tends to be flocculated like entanglement of thread when the fiber carbon is dispersed in slurry or paste. When the fiber carbon is flocculated, the preferable alignment of the fiber carbon is not achieved in the electric collector layer after firing. As a result, preferable current collecting may not be necessarily achieved and the short may occur between the positive electrode and the negative electrode.

Next, it is thought that fine particle carbon such as acetylene black is used. However, the fine particle carbon is easily oxidized because the fine particle carbon has a large specific surface area. When the fine particle carbon is fired together with Pd, the fine particle carbon is oxidized because of strong catalytic action of Pd. Even if the fine particle carbon is subjected to inert atmosphere such as $N_2$ gas flow, the fine particle carbon may be converted in $CO$ or $CO_2$ and may disappear. Thus, a continuity modulus of the electric collector may be degraded. And, defect such as degradation of conductivity may occur. The fine particle carbon may disappear during the firing. Therefore, preferable current collecting may not be necessarily achieved.

Next, it is thought that graphite carbon is used. However, the graphite carbon has a large diameter. Therefore, when the graphite carbon is used, the first electric collector layer 12 and the second electric collector layer 22 may get thicker. Neither the first electric collector layer 12 nor the second electric collector layer 22 contributes to capacity. It is therefore preferable that the first electric collector layer 12 and the second electric collector layer 22 are as thin as possible, from a viewpoint of high energy density.

And so, in the embodiment, board-shaped graphite carbon is mixed with Pd in the first electric collector layer 12 and the second electric collector layer 22. It is possible to define the board-shaped graphite carbon as follows. The longest size in a planar direction of the board-shaped graphite carbon is 5 μm or more. A ratio of the longest size with respect to the thickness of the board-shaped graphite carbon (aspect ratio) is 5 or more. A ratio of the shortest size in the planar direction of the board-shaped graphite carbon with respect to the thickness (another aspect ratio) is 2 or more. It is preferable that the ratio is 5 or more. It is more preferable that the ratio is 10 or more. It is preferable that the longest size of the board-shaped graphite carbon is 20 μm or less in a range of the aspect ratio. When the longest size is 20 μm or more, the board-shaped graphite carbon may project from an upper face of the coating film during forming of the electric collector layer. In addition to loss of smoothness, when the projection distance is large, the board-shaped graphite carbon passes through the electrode layer and the solid electrolyte layer and reaches another electrode layer. And the short may occur.

The board-shaped graphite carbon is different from the fiber carbon and is not fibrous. Therefore, when the board-shaped graphite carbon is dispersed in the slurry or the paste, the board-shaped graphite carbon is hardly flocculated. It is therefore possible to achieve preferable alignment of the board-shaped graphite carbon in the electric collector layer after the firing. And, it is possible to achieve preferable current collecting and suppress the short between the positive electrode and the negative electrode. Moreover, the board-shaped graphite carbon is different from the fine particle carbon. Therefore, the board-shaped graphite carbon is hardly decomposed even if the board-shaped graphite carbon exists together with Pd. And, the board-shaped graphite carbon hardly disappears in the firing. Moreover, the board-shaped graphite carbon has a small diameter. It is therefore possible to suppress thickness enlargement of the first electric collector layer 12 and the second electric collector layer 22. Accordingly, the all solid battery 100 can achieve preferable performance with low cost, when Pd is mixed with the board-shaped graphite carbon in the first electric collector layer 12 and the second electric collector layer 22.

When an occupancy ratio of the board-shaped graphite carbon is excessively low in the first electric collector layer 12 and the second electric collector layer 22, sufficient reduction of the usage amount of Pd may not be necessarily achieved. And so, it is preferable that the occupancy ratio of the board-shaped graphite carbon with respect to Pd has a lower limit, in the first electric collector layer 12 and the second electric collector layer 22. On the other hand, when the occupancy ratio of the board-shaped graphite carbon is excessively high in the first electric collector layer 12 and the second electric collector layer 22, the amount of carbon may be large in the first electric collector layer 12 and the second electric collector layer 22. And, the first electric collector layer 12 and the second electric collector layer 22 may not be necessarily sintered. Thereby, adhesive strength between the first electric collector layer 12 and the first electrode layer 11 and between the second electric collector layer 22 and the second electrode layer 21 may be reduced. And, delamination may occur and whole mechanical strength of the all solid battery 100 may be reduced. Moreover, the current collecting of the electric collector layer may be degraded because the amount of Pd for connecting the board-shaped graphite carbon and another board-shaped graphite carbon is small and the continuity modules of the electric collector layer is reduced. It is therefore preferable that a volume ratio of the board-shaped graphite carbon has an upper limit and a lower limit in the first electric collector layer 12 and the second electric collector layer 22. For example, in the first electric collector layer 12 and the second electric collector layer 22, it is preferable that the volume ratio between Pd and the board-shaped graphite carbon is 20:80 to 80:20. It is more preferable that the volume ratio is 30:70 to 70:30.

Figure 2:
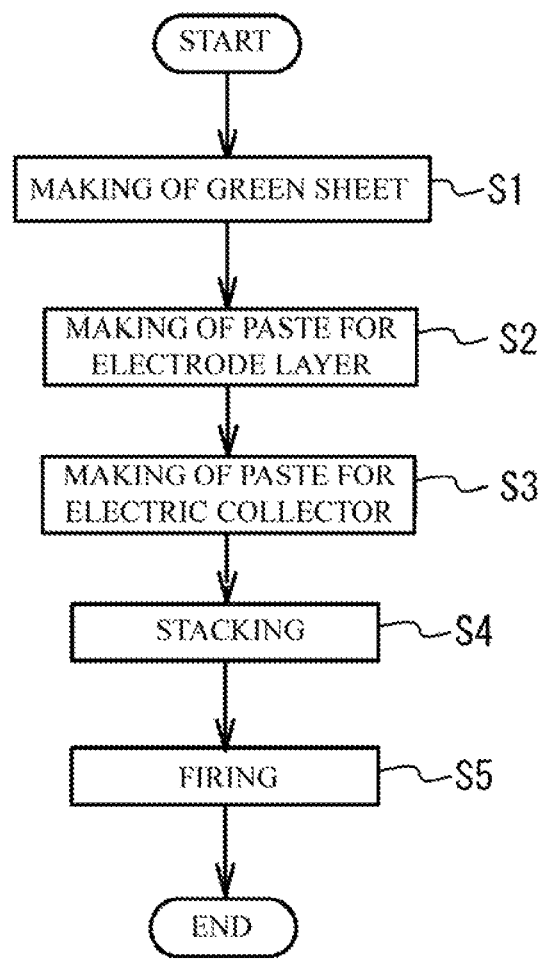
FIG. 2 illustrates a flowchart of a manufacturing method of an all solid battery.

Next, a description will be given of a manufacturing method of the all solid battery 100. FIG. 2 illustrates a flowchart of the manufacturing method of the all solid battery 100.

(Making Process of Green Sheet)

The powders of the oxide-based solid electrolyte structuring the solid electrolyte layer 30 is prepared so as to have appropriate particle size distribution. The resulting powders are evenly dispersed into aqueous solvent or organic solvent together with a binding agent, a dispersing agent, a plasticizer and so on. And slurry is obtained. In this case, a bead mill, a wet jet mill, a kneader, a high pressure homogenizer or the like may be used. It is preferable that the bead mill is used because adjusting of particle size distribution and dispersion are performed at the same time. The resulting slurry is coated. Thus, a green sheet having a desirable thickness is obtained. The coating method is not limited. For example, a slot die method, a reverse coat method, a gravure coat method, an over coat method, a doctor blade method or the like may be used.

(Making Process of Paste for Electrode Layer)

A conductive auxiliary agent, an active material, a solid electrolyte material, a binder, a plasticizer and so on are evenly dispersed into water or organic solvent. Thus, paste for electrode layer is obtained. Pd, Ni, Cu, Fe or an alloy thereof may be used as the conductive auxiliary agent.

(Making Process of Electric Collector Paste)

It is possible to make paste for an electric collector, by evenly dispersing powder of Pd, the board-shaped graphite carbon, a binder, dispersant, plasticizer and so on into water or organic solvent.

(Stacking Process)

The paste for electrode layer and the conductive metal paste for electric collector are printed on both faces of the green sheet. The printing method is not limited. For example, a screen printing method, an intaglio printing method, a letter press printing method, a calendar roll printing method or the like may be used. In order to make a stacked device having a thin layer and a large number of stacked layers, the screen printing is generally used. However, an ink jet printing may be preferable when a micro size electrode pattern or a special shape is necessary.

(Firing Process)

Next, the obtained multilayer structure is fired. The firing is performed in an oxidizing atmosphere or non-oxidizing atmosphere. A maximum temperature of the firing is 400 degrees C. to 1000 degrees C. It is preferable that the maximum temperature is 500 degrees C. to 900 degrees C. In order to sufficiently remove the binder before the maximum temperature, a temperature lower than the maximum temperature may be held in an oxidizing atmosphere. It is preferable that the multilayer structure is fired at a minimum temperature in an oxidizing atmosphere, in order to reduce the process cost. After firing, a re-oxidation process may be performed. In this manner, the all solid battery 100 is manufactured.

Figure 3A:
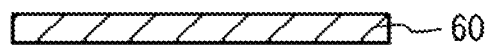
FIG. 3A to FIG. 3E illustrate schematic cross sections for describing a manufacturing method of a case where a plurality of cell units are stacked.
Figure 3B:
Figure 3C:
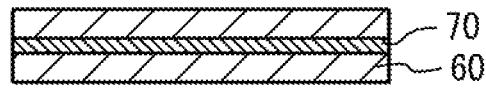
Figure 3D:
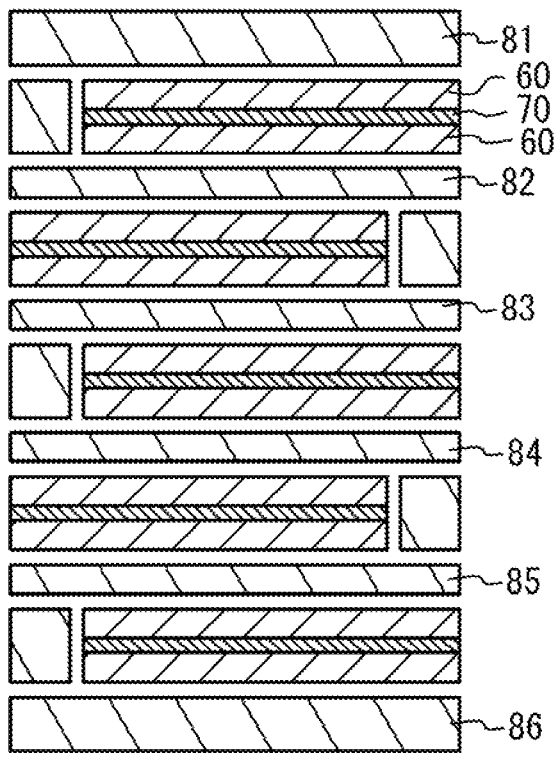
Figure 3E:
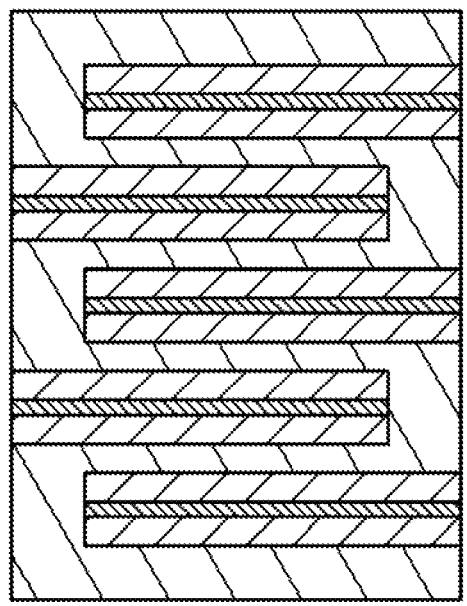

FIG. 3A to FIG. 3E illustrate schematic cross sections for describing a manufacturing method of a case where a plurality of cell units are stacked. As illustrated in FIG. 3A, a precursor 60 for an electrode layer is prepared with use of paste for electrode layers. As illustrated in FIG. 3B, a conductive metal paste acting as a precursor 70 for an electric collector is printed on one face of the precursor 60. As illustrated in FIG. 3C, a multilayer structure in which the precursor 70 is sandwiched by two precursors 60 is prepared. Next, a plurality of the multilayer structures illustrated in FIG. 3C are prepared, and are stacked. As illustrated in FIG. 3D, precursors 81 to 86 for solid electrolyte layers are suitably arranged with use of the above-mentioned green sheets. After that, by compressing, a multilayer structure illustrated in FIG. 3E is formed. The resulting multilayer structure is cut if necessary and is fired in accordance with the firing process.

In the manufacturing method of the embodiment, the paste for an electric collector includes Pd and the board-shaped graphite carbon. In this case, it is possible to reduce the usage amount of Pd. It is therefore possible to suppress the cost. The board-shaped graphite carbon is different from the fiber carbon and is not fibrous. Therefore, when the board-shaped graphite carbon is dispersed in the slurry or the paste, the board-shaped graphite carbon is hardly flocculated. It is therefore possible to achieve preferable alignment of the board-shaped graphite carbon in the electric collector layer after the firing. And, it is possible to achieve preferable current collecting and suppress the short between the positive electrode and the negative electrode. Moreover, the board-shaped graphite is different from the fine particle carbon. Therefore, the board-shaped graphite carbon is hardly decomposed even if the board-shaped graphite carbon exists together with Pd. And, the board-shaped graphite carbon hardly disappears in the firing. Moreover, the board-shaped graphite carbon has a small diameter. It is therefore possible to suppress thickness enlargement of the first electric collector layer 12 and the second electric collector layer 22. Accordingly, the all solid battery 100 can achieve preferable performance with low cost, when Pd is mixed with the board-shaped graphite carbon in the first electric collector layer 12 and the second electric collector layer 22.

EXAMPLES

The all solid batteries in accordance with the embodiment were made and the property was measured.

Examples 1 to 5

Figure 4A:
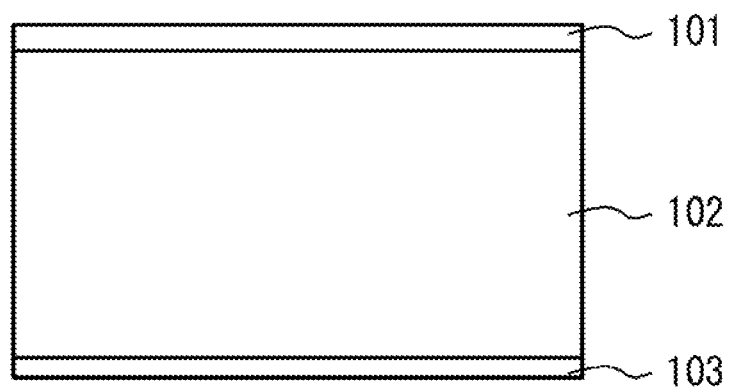
FIG. 4A illustrates a first structure.

The paste for an electric collector was coated on a green sheet. After that, the paste and the green sheet were fired. Thus, two types structures (a first structure and a second structure) including a Li—Al—Ge—$PO_4$ based solid electrolyte layers and electric collector layers were made. As illustrated in FIG. 4A, the first structure has a structure (CC|SE|CC) in which a first electric collector layer 101 is provided on a first main face of a solid electrolyte layer 102, and a second electric collector layer 103 is provided on a second main face of the solid electrolyte layer 102. The second structure has a structure (SE|CC|SE) in which a solid electrolyte layer 104 and a solid electrolyte layer 106 sandwich an electric collector layer 105. In the second structure, an external electrode 107 is provided on a first edge face, and an external electrode 108 is provided on a second edge face.

In the examples 1 to 5, each electric collector layer included a mixture of Pd and the board-shaped graphite carbon. In the example 1, the volume ratio of Pd and the graphite carbon was 80:20. In the example 2, the volume ratio of Pd and the graphite carbon was 70:30. In the example 3, the volume ratio of Pd and the graphite carbon was 50:50. In the example 4, the volume ratio of Pd and the graphite carbon was 30:70. In the example 5, the volume ratio of Pd and the graphite carbon was 20:80.

Comparative Examples 1 to 4

In a comparative example 1, in each electric collector layer, the volume ratio of Pd and the graphite carbon was 100:0. That is, carbon was not used. Other conditions were the same as those of the example 1. In a comparative example 2, in each electric collector layer, the volume ratio of Pd and the graphite carbon was 10:90. Other conditions were the same as those of the example 1. In a comparative example 3, in each electric collector layer, the volume ratio of Pd and the graphite carbon was 0:100. That is, Pd was not used. Other conditions were the same as those of the example 1. In a comparative example 4, in each electric collector layer, a volume ratio of Pd and carbon black was 50:50. That is, carbon black was used instead of the board-shaped graphite carbon. Other conditions were the same as those of the example 1.

(Analysis)

A cross section of each electric collector layer was observed by SEM. In the examples 1 to 5 and the comparative examples 2 and 3, the board-shaped graphite carbon was aligned so as to lie in an extraction direction (planar direction) of the electric collector layer. On the other hand, in the comparative example 4, a large amount of the fine particle carbon disappeared.

With respect to the first structure, it was confirmed whether characteristic of the solid electrolyte layer 102 can be evaluated between the first electric collector layer 101 and the second electric collector layer 103 by measuring AC impedance after the firing, without any problems. AC impedance was measured in Au|SE|Au in which a gold electrode of approximately 50 nm acting as the electric collector layer was formed by a sputtering method. Au|SE|Au has the same structure as the first structure. The example or the comparative example was determined as "OK", when a value of comprehensive conductivity (total of a bulk component and a grain boundary component) calculated from the result was approximately the same as the comprehensive conductivity calculated from the result of a sample of CC|SE|CC. Otherwise, the example or the comparative example was determined as "NG". The examples 1 to 5 were determined as "OK". It is thought that this was because the usage amount of the carbon material was not too much and the adhesive strength between the ceramics of the solid electrolyte layer and the electric collector layer was preferable, because the volume ratio of Pd and the board-shaped graphite carbon was 20:80 to 80:20 in each electric collector layer. On the other hand, the comparative examples 2 to 4 were determined as "NG". It is thought that this was because the usage amount of the carbon material was large and the adhesive strength between the ceramics of the solid electrolyte layer and the electric collector layer was not sufficient, with respect to the comparative examples 2 and 3. It is thought that this was because the fine particle carbon black disappeared during the firing, with respect to the comparative example 4. Although the comparative example 1 was determined as "OK", the usage amount of Pd was large and the cost was also large.

Figure 4B:
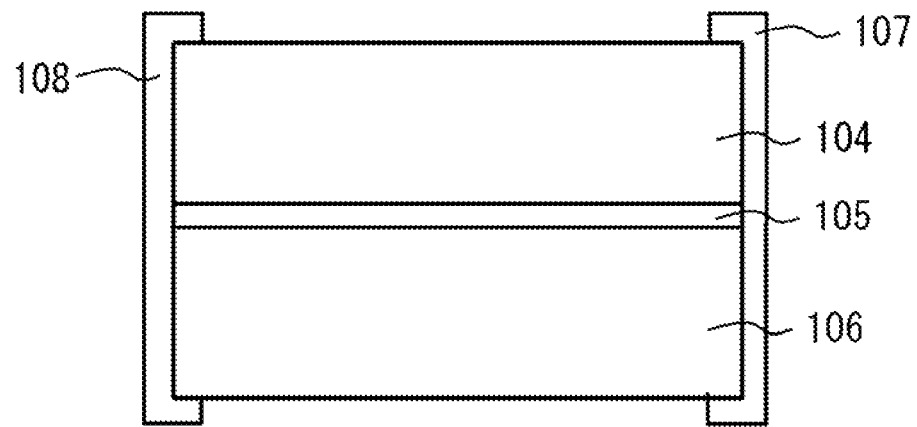
FIG. 4B illustrates a second structure.

With respect to the second structure, it was confirmed whether the external electrode 107 was short-circuited with the external electrode 108. In the second structure illustrated in FIG. 4B, when the current collecting of the electric collector layer 105 is preferable, the external electrode 107 is short-circuited with the external electrode 108. Therefore, the example or the comparative example in which the external electrode 107 was short-circuited with the external electrode 108 was determined as "OK". Otherwise, the example or the comparative example was determined as "NG". The examples 1 to 5 were determined as "OK". It is thought that this was because preferable alignment was achieved because the board-shaped graphite carbon was used, and the usage amount of the carbon material was not too much because the volume ratio of Pd and the board-shaped graphite carbon was 20:80 to 80:20. The comparative examples 2 and 3 were determined as "NG". It is thought that this was because the electric collector layer was not sufficiently sintered and preferable conductivity was not achieved because the usage amount of the carbon material was large. The comparative example 4 was determined as "NG". It is thought that this was because the fine particle carbon disappeared. Alternatively, it is thought that even if the fine particle carbon existed, the preferable alignment was not achieved because the carbon was fine particle. Although the comparative example 1 was determined as "OK", the usage amount of Pd was large and the cost was also large.

Comprehensive evaluation was determined as "OK", when the example was determined as "OK" in both the AC impedance measurement and the short test. Otherwise, the comprehensive evaluation was determined as "NG". The examples 1 to 5 were determined as "OK". It is thought that this was because the electric collector layer included Pd and the board-shaped graphite carbon and the volume ratio of Pd and the board-shaped graphite carbon was 20:80 to 80:20. Although the comparative example 1 was determined as "OK" in both the AC impedance measurement and the short test, the comprehensive evaluation of the comparative example 1 was determined "NG" because the comparative example 1 did not include carbon and the cost was large.

TABLE 1

|  | Pd/CARBON | CARBON TYPE | CC\|SE\|CC | SE\|CC\|SE | COMPREHENSIVE EVALUATION |
|---|---|---|---|---|---|
| EXAMPLE 1 | 80/20 | BOARD-SHAPED GRAPHITE | ○ | ○ | ○ |
| EXAMPLE 2 | 70/30 | BOARD-SHAPED GRAPHITE | ○ | ○ | ○ |
| EXAMPLE 3 | 50/50 | BOARD-SHAPED GRAPHITE | ○ | ○ | ○ |
| EXAMPLE 4 | 30/70 | BOARD-SHAPED GRAPHITE | ○ | ○ | ○ |
| EXAMPLE 5 | 20/80 | BOARD-SHAPED GRAPHITE | ○ | ○ | ○ |
| COMPARATIVE EXAMPLE 1 | 100/0 | NONE | ○ | ○ | X |

TABLE 1-continued

| | Pd/CARBON | CARBON TYPE | CC|SE|CC | SE|CC|SE | COMPREHENSIVE EVALUATION |
|---|---|---|---|---|---|
| COMPARATIVE EXAMPLE 2 | 10/90 | BOARD-SHAPED GRAPHITE | X NOT SINTERED | X OPEN | X |
| COMPARATIVE EXAMPLE 3 | 0/100 | BOARD-SHAPED GRAPHITE | X NOT SINTERED | X OPEN | X |
| COMPARATIVE EXAMPLE 4 | 50/50 | CARBON BLACK | X CARBON DISAPPEARED | X OPEN | X |

Although the embodiments of the present invention have been described in detail, it is to be understood that the various change, substitutions, and alterations could be made hereto without departing from the spirit and scope of the invention.

What is claimed is:

1. An all solid battery comprising:
a solid electrolyte layer including phosphoric acid salt-based solid electrolyte;
a first electrode layer that is formed on a first main face of the solid electrolyte layer;
a first electric collector layer that is formed on a face of the first electrode layer, the face being opposite to the first main face;
a second electrode layer that is formed on a second main face of the solid electrolyte layer; and
a second electric collector layer that is formed on a face of the second electrode layer, the face being opposite to the second main face,
wherein at least one of the first electric collector layer and the second electric collector layer includes Pd and board-shaped graphite carbon,
wherein a volume ratio of Pd and the board-shaped graphite carbon in the at least one of the first electric collector layer and the second electric collector layer is 20:80 to 80:20.

2. The all solid battery as claimed in claim 1, wherein a longest size of a planar direction of the board-shaped graphite carbon is 5 μm or more,
wherein an aspect ratio of the longest size and a thickness of the board-shaped graphite carbon is 5 or more,
wherein another aspect ratio of a shortest size in the planar direction and the thickness of the board-shaped graphite carbon is 2 or more.

3. The all solid battery as claimed in claim 1, wherein the phosphoric acid salt-based solid electrolyte has a NASICON structure.

4. A manufacturing method of an all solid battery comprising:
preparing a multilayer structure in which a first paste for a first electrode layer including ceramic grains, a green sheet including phosphoric acid salt-based grains, a second paste for a second electrode layer including ceramic grains, and a second paste for a second electric collector are stacked in this order on a first paste for a first electric collector; and
firing the multilayer structure,
wherein at least one of the first paste for the first electric collector and the second paste for the second electric collector includes Pd and board-shaped graphite carbon,
wherein a volume ratio of Pd and the board-shaped graphite carbon in the at least one of the first paste for the first electric collector and the second paste for the second electric collector is 20:80 to 80:20.

* * * * *